UNITED STATES PATENT OFFICE.

CHRISTIAN GÖTTIG AND WALTHER KÖTTGEN, OF WILMERSDORF, GERMANY, ASSIGNORS TO LUDWIG DARMSTAEDTER, OF BERLIN, GERMANY.

MIXTURE FOR SILVERING METALS.

SPECIFICATION forming part of Letters Patent No. 663,340, dated December 4, 1900.

Application filed May 15, 1900. Serial No. 16,801. (No specimens.)

*To all whom it may concern:*

Be it known that we, CHRISTIAN GÖTTIG, professor, residing at 11 Ludwigskirch-Platz, and WALTHER KÖTTGEN, merchant, residing at 42 Güntzelstrasse, Wilmersdorf, near Berlin, Germany, subjects of the German Emperor, have invented certain new and useful Improvements in Mixtures for Silvering Metals; and we do hereby declare the following to be a full, clear, and exact description of the invention, such as will enable others skilled in the art to which it appertains to make and use the same.

This invention relates to a mixture for silvering certain metals, notably copper and copper alloys, by application to the surface of such metals.

The mixture consists of silver chlorid, salts which dissolve silver chlorid, and chlorids which are capable of readily parting with the chlorin, which may either be given off as chlorin gas or combined with hydrogen to form hydrochloric acid, or both, and transfer such chlorin to the dark compounds which result from the action of light on the silver chlorid, thereby practically maintaining such silver chlorid unchanged. Good examples of such chlorids are ferric chlorid, cupric chlorid, aluminium chlorid, and the like, and one among several good effects which they have in the mixture is the maintenance of the activity of the silver chlorid. The iron or copper chlorids and the like are capable of yielding chlorin, as stated, and of being reduced to the lower chlorids. The liberated chlorid is immediately transferred to the dark compound, supposed to be the silver subchlorid which results from the action of the light upon the latter, and immediately converts the dark-colored subchlorid and other silver compounds that may be formed back to the white silver chlorid. Therefore when the said chlorids are mixed with a silver chlorid the formation of the dark subchlorids from the white silver chlorids is practically avoided, for the reason that any such subchlorids that might be formed would be immediately reconverted into silver chlorid by the protecting ferric or other chlorids referred to above. In the process of coating a metal capable of combining with the chlorin liberated from silver chlorid, such as copper, a reaction takes place, which may be expressed by the following equation: $Cu + 2AgCl = CuCl_2 + 2Ag$. Where the object to be silvered consists of another metal or alloy—for example, German silver, brass, or the like—the reaction taking place is analogous. The metal to be silvered combines with the chlorin of the silver chlorid and the silver is set free in a shining metallic condition and is deposited upon the object to be silvered as a bright coating. The metal of the protecting chlorid, such as ferric chlorid, does not combine with the silver in the depositing action, the purpose of such addition of ferric chlorid or equivalent being merely to prevent permanent reduction of the silver chlorid by the decomposing action of the light. Hereby the effectiveness of the silvering compound is maintained for a much longer time than would otherwise be possible, since only the silver chlorid and not the subchlorid of silver, which is formed when no such protecting chlorid is present, is available for the silvering process. The reason why the black silver subchlorid is not adapted for the silvering process is that such silver subchlorid is not soluble in the alkali chlorids and similar chlorids, while the white silver chlorid is readily soluble in solutions of the alkali chlorids. From the solutions thus formed the silver is thrown out in a brilliant metallic layer by the reducing agents also present in the mixture. These reducing agents will not attack the undissolved subchlorids and are therefore not capable of precipitating the silver from the subchlorid on the object to be plated. Instead of these metallic chlorids themselves compounds of them, such as double salts like stannic ammonium chlorid, may be used. As salts which dissolve silver chlorid may be used sodium chlorid, potassium chlorid, ammonium chlorid, calcium chlorid, magnesium chlorid, zinc chlorid, sodium thiosulfate, and the like. Additions which facilitate the silvering, such as potassium bitartrate, may be made, and instead of silver chlorid mixtures which yield this compound, such as a mixture of silver nitrate and sodium chlorid, are applicable. Such mixtures are therefore mere equivalents for the silver chlorid and are covered by the claims appended to this specification.

The proportion of silver chlorid in the mixture is varied in accordance with the required degree of activity of the mixture, the rapidity with which the silvering is to be effected, and the desired thickness of the coating. The proportion of the metallic chlorids capable of yielding chlorin may be varied within wide limits, depending largely on the effect which is had in view, the maximum quantity thereof being about one-third of the entire mixture. The workman must find by a preliminary test what proportion is best fitted for his particular purpose.

The following is an example of the composition of a mixture made in accordance with this invention: silver chlorid, one part; potassium chlorid, three parts; potassium bitartrate, two parts; ferric chlorid, two parts; water, three to four parts. There may also be added to the mixture substances which are known cleaning materials for metals, such as levigated chalk, ammonia, tripoli, and the like. The proportion of such additions depends, essentially, on whether the mixture is to have a large or small content of silver chlorid. The following is an example: silver chlorid, one part; potassium chlorid, three parts; ferric chlorid, two parts; stannic potassium chlorid, one part; calcium chlorid, two parts; clay, eight parts; levigated chalk, two parts; water, eleven parts. The materials are powdered, intimately mixed with each other, and triturated with water to make a pasty mass. This may be applied to the metal object to be silvered by means of a brush or in any other known manner.

We are aware that tin chlorid has been heretofore used in connection with silver chlorid for coating; but the use of tin chlorid in this connection is for a different purpose from that contemplated by the present invention. The tin from the tin chlorid is deposited together with the silver from the silver chlorid used in connection therewith. This is not the case with the class of chlorids employed by us, since in these chlorids silver will not be deposited together with the tin and will therefore not form a part of the coating to be produced. Moreover, the iron or equivalent chlorid employed by us performs a function in our mixture which the tin chlorid is incapable of. Tin chlorid does not possess the power of transferring the chlorin to the subchlorid, which may be formed from the silver chlorid under the action of light, while the ferric chlorid and the equivalent chlorids possess this property.

To sum up, our invention is essentially distinguished in its main feature by the fact that it involves the use of a chlorid capable of preventing permanent reduction of the silver chlorid by the decomposing action of the light, the chlorids which we have selected for this purpose having the property of yielding up chlorin and transferring the same to any subchlorid of silver that may be formed from the silver chlorid under the action of light as fast as the same is produced.

The silvering mixture involving our invention may be put up for the market, together with water, as described above or in a dry condition, the water being subsequently added when using the mixture.

Having thus described the nature of our said invention and the best means we know of carrying the same into practical effect, we claim—

1. A mixture for silvering metals comprising silver chlorid, a compound whose solution is capable of dissolving silver chlorid and a metal chlorid capable of preventing the permanent reduction of the silver chlorid by the action of light.

2. A mixture for silvering metals comprising silver chlorid, the salt of an alkali metal whose solution is capable of dissolving silver chlorid, and a metal chlorid capable of yielding chlorin and transferring the same to any silver subchlorid formed from the silver chlorid under the influence of light.

3. A mixture for silvering metals comprising silver chlorid, the salt of an alkali metal whose aqueous solution is capable of dissolving silver chlorid and ferric chlorid.

4. A mixture for silvering metals comprising silver chlorid, a compound whose aqueous solution is capable of dissolving silver chlorid, a metallic chlorid capable of yielding up chlorin and transferring the same to any decomposition product formed from the silver chlorid under the action of light and a material which favors the silvering action.

In testimony whereof we affix our signatures in presence of two witnesses.

CHRISTIAN GÖTTIG.
WALTHER KÖTTGEN.

Witnesses:
HENRY HASPER,
WOLDEMAR HAUPT.